US011067039B1

(12) United States Patent
Costanzo

(10) Patent No.: US 11,067,039 B1
(45) Date of Patent: Jul. 20, 2021

(54) HIGH COMPRESSION BOOSTING AND WATER GENERATION

(71) Applicant: Saudi Arabian Oil Company, Dhahran (SA)

(72) Inventor: Vincent Stanley Costanzo, Berkley, MI (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/870,259

(22) Filed: May 8, 2020

(51) Int. Cl.
| | | |
|---|---|---|
| *F02M 25/03* | (2006.01) | |
| *B01D 5/00* | (2006.01) | |
| *F02M 25/022* | (2006.01) | |
| *F02M 35/10* | (2006.01) | |
| *B01D 53/00* | (2006.01) | |
| *E03B 3/28* | (2006.01) | |

(52) U.S. Cl.
CPC ........... *F02M 25/03* (2013.01); *B01D 5/0003* (2013.01); *B01D 5/0051* (2013.01); *B01D 53/002* (2013.01); *F02M 25/0222* (2013.01); *F02M 35/10209* (2013.01); *F02M 35/10262* (2013.01); *E03B 3/28* (2013.01)

(58) Field of Classification Search
CPC .. F02M 25/03; F02M 25/0222; F02M 25/025; F02M 35/10262; F02M 35/10209; F02D 19/12; F02D 41/0025; E03B 3/28
See application file for complete search history.

(56) References Cited

U.S. PATENT DOCUMENTS

| | | | |
|---|---|---|---|
| 3,100,146 A | 8/1963 | Huntington | |
| 7,302,795 B2 | 12/2007 | Vetrovec | |
| 7,530,336 B2 | 5/2009 | Brecheisen | |
| 7,775,063 B2* | 8/2010 | Thompson | B01D 5/0048 62/271 |
| 9,874,163 B1 | 1/2018 | Hakeem et al. | |
| 9,932,921 B2 | 4/2018 | Hoard et al. | |
| 2018/0320638 A1* | 11/2018 | Kouzel | F02B 29/0468 |
| 2019/0323455 A1* | 10/2019 | Chini | F02M 25/025 |
| 2020/0290433 A1* | 9/2020 | Brugnoni | B60H 1/00 |

FOREIGN PATENT DOCUMENTS

DE 102016206043 A1 * 10/2017 ............. B01D 5/009

\* cited by examiner

*Primary Examiner* — Grant Moubry
(74) *Attorney, Agent, or Firm* — Leason Ellis LLP

(57) ABSTRACT

A method and system for condensing water for injection into an internal combustion engine to increase the engine's fuel economy and performance while reducing emissions. A volume of ambient air is drawn through an intake valve into a sealable chamber. The intake valve is closed and the ambient air compressed within the sealed sealable chamber and thereafter vented through an exit valve to be contained in a cooling section. The cooling section comprises a port and a cooling device. The cooling device, which in one embodiment comprises a refrigeration unit, cools the ambient air contained within the cooling channel to condense water vapor present in the ambient air into liquid water. The liquid water is drained from the cooling channel through the port and collected in a reservoir. Liquid water from the reservoir is then injected into at least one combustion chamber of the internal combustion engine.

14 Claims, 3 Drawing Sheets

HIGH COMPRESSION BOOSTING AND WATER GENERATION

FIELD OF THE DISCLOSURE

This patent application relates to methods and systems for condensing water from ambient air and then injecting it into an internal combustion engine to effect improvements in engine performance, and, more particularly, to methods and systems for capturing quantities of air during the operation of the internal combustion engine, compressing them within a sealed chamber such as a piston-in-cylinder assembly, and then cooling each compressed volume of ambient air to condense water vapor contained therein into liquid form for injection into the combustion chambers of the internal combustion engine, thereby realizing benefits including increases in fuel economy and reductions in engine emissions.

BACKGROUND OF THE DISCLOSURE

The internal combustion engine revolutionized transportation beginning in the late eighteenth century. Prior to its introduction, mankind had relied on the power of various beasts of burden, especially horses, to provide a mode of powered transportation. Internal combustion engines served in large part to power the Industrial Revolution, and they continue to almost single-handedly serve as the engines of transportation and commerce today, as most alternative arrangements for generating propulsive power are still not sufficiently practical or mature in their development to be used on a large-scale basis.

Naturally, a powerplant that is so widely employed has seen numerous attempts at improvement as researchers have tried to squeeze more performance, such as increases in power and fuel efficiency, out of the ubiquitous internal combustion engine while also seeking to reduce environmentally detrimental emissions. One prominent solution arrived at by various researchers at different times over the years has been the judicious introduction or injection of water into the internal combustion engine. For example, U.S. Pat. No. 9,932,921 to Hoard et al. describes one such method and system whereby water condensed from the charge air cooler (CAC) can be injected into the engine intake manifold to suppress engine knock tendency and reduce the production of nitrogen oxides (NOx), and such injection during transient conditions is stated to even remedy a lag in response from the low-pressure exhaust gas recirculation (LP EGR) system. Hoard implements an algorithm whereby engine speeds and mean effective pressures have been correlated graphically on a "speed-load" map that takes current engine operating conditions as inputs and determines the optimal vehicle engine location for water injection. Hoard also injects water at points upstream of the low- and high-pressure exhaust gas recirculation (EGR) coolers to achieve a cleaning effect, as well as cause further cooling of the EGR system, both conditions which further decrease NOx emissions. However, while Hoard has endeavored to make use of unwanted CAC condensation by collecting it, storing it, and then injecting it into the engine, the very reliance upon a CAC as a cool surface upon which unwanted condensation can form can itself pose problems, including freezing damage and the reliance upon an unpredictable supply of condensation Another example of the use of water injection into an internal combustion engine is disclosed in U.S. Pat. No. 9,874,163 to Hakeem et al. According to Hakeem, engine operating conditions are first measured or estimated. These conditions can include manifold pressure (MAP), air-fuel ratio (A/F), spark timing, fuel injection amount or timing, an exhaust gas recirculation (EGR) rate, mass air flow (MAF), manifold charge temperature (MCT), as well as engine speed or load. When measured or estimated engine parameters at respective points in the engine exceed specified threshold values, water injections are triggered to improve engine performance. Examples of conditions prompting water injection include manifold temperature exceeding a specified value or engine knock being above a certain threshold. While Hakeem's disclosed system stands ready to inject water where and when needed to improve engine performance, it relies for its water supply upon condensate collected from the engine or vehicle systems, or even condensation from an exhaust gas recirculation system or the vehicle air conditioning system. Like Hoard, Hakeem's reliance upon condensation formed on engine components may lead to an unpredictable water supply. Furthermore, Hakeem's condensation of water vapor from exhaust gases is highly likely to result in a condensate contaminated with hydrocarbon combustion by-products that will certainly foul and may even damage critical engine components, thus defeating its stated purpose of improving engine performance.

It is with respect to this background that the present disclosure is addressed.

SUMMARY OF THE DISCLOSURE

The present disclosure provides a method and system whereby quantities of ambient air are captured during the operation of an internal combustion engine, then compressed within a sealed chamber such as a piston-in-cylinder assembly, and subsequently cooled to condense water vapor contained therein into liquid form for injection into the combustion chambers of the internal combustion engine, thereby realizing benefits including increases in fuel economy and reductions in engine emissions.

In an embodiment of a method in accordance with aspects of the disclosure, a volume of ambient air is drawn through an intake valve into a sealable chamber, after which the intake valve is closed to seal the sealable chamber. The ambient air is then compressed within the sealed sealable chamber, and an exit valve of the sealable chamber is opened to vent the compressed ambient air from the sealable chamber to a cooling section. The cooling section comprises a cooling channel and a cooling device, wherein the cooling channel comprises a port and contains the compressed ambient air. The cooling device is used to cool the ambient air contained within the cooling channel to condense water vapor present in the ambient air into liquid water. The liquid water is drained from the cooling channel through the port and collected in a reservoir. Liquid water from the reservoir is then injected into at least one combustion chamber of the internal combustion engine to achieve improvements in engine performance.

In an embodiment in accordance with the disclosure, the method further comprises introducing the compressed ambient air into at least one combustion chamber of the internal combustion engine. In a further embodiment in accordance with the disclosure, the compressed ambient air is introduced through an intake manifold of the internal combustion engine. In a still further embodiment in accordance with the disclosure, the compressed ambient air is directed through a mixing valve of the intake manifold to be mixed with ambient air.

In an embodiment in accordance with the disclosure, the cooling device comprises a refrigeration unit, wherein the refrigeration unit comprises a refrigerant-conducting refrigerant channel that is disposed proximally to the cooling channel to remove heat energy from the compressed ambient air.

In an embodiment in accordance with the disclosure, the sealable chamber comprises a piston-in-cylinder assembly, and in a further embodiment in accordance with the disclosure, the piston-in-cylinder assembly is driven by a crankshaft of the internal combustion engine.

In an embodiment of a system in accordance with aspects of the disclosure, a sealable chamber is coupled to the internal combustion engine and configured to draw in and compress a volume of ambient air. The sealable chamber comprises an intake valve, which in an open state is configured to allow ambient air to be drawn into the sealable chamber, and which in a closed state is configured to seal the ambient air in the sealable chamber. The sealable chamber also comprises an exit valve, which in a closed state is configured to seal the ambient air in the sealable chamber, and which in an open state is configured to allow the compressed ambient air to vent from the sealable chamber. The system further comprises a cooling section configured to receive the compressed ambient air vented through the exit valve from the sealable chamber. The cooling section comprises a cooling channel and a cooling device, wherein the cooling channel comprises a port and contains the compressed ambient air. The cooling device is configured to cool the ambient air contained within the cooling channel to condense water vapor present in the ambient air into liquid water. A reservoir is connected to the port and configured to collect liquid water drained through the port from the cooling channel. The system further comprises a water injector, wherein the water injector is configured to inject liquid water from the reservoir into at least one combustion chamber of the internal combustion engine to achieve improvements in engine performance.

In an embodiment in accordance with the disclosure, the system is further configured to introduce the compressed ambient air into at least one combustion chamber of the internal combustion engine. In a further embodiment in accordance with the disclosure, the internal combustion engine further comprises an intake manifold through which the compressed ambient air is introduced. In a still further embodiment in accordance with the disclosure, the compressed ambient air is directed through a mixing valve of the intake manifold to be mixed with ambient air.

In an embodiment in accordance with the disclosure, the cooling device comprises a refrigeration unit, wherein the refrigeration unit comprises a refrigerant-conducting refrigerant channel that is disposed proximally to the cooling channel to remove heat energy from the compressed ambient air.

In an embodiment in accordance with the disclosure, the sealable chamber comprises a piston-in-cylinder assembly, and in a further embodiment in accordance with the disclosure, the piston-in-cylinder assembly is driven by a crankshaft of the internal combustion engine.

These and other features, aspects, and advantages can be appreciated from the following description of certain embodiments in accordance with the present disclosure.

BRIEF DESCRIPTION OF THE DRAWINGS

The accompanying drawing figures illustrate exemplary embodiments and are not intended to be limiting of the present disclosure. Among the drawing figures, like references are intended to refer to like or corresponding parts.

DETAILED DESCRIPTION OF CERTAIN EMBODIMENTS ACCORDING TO THE DISCLOSURE

The present disclosure concerns a method and system for condensing water from ambient air and then injecting it into an internal combustion engine to effect improvements in engine performance.

Figure 1:
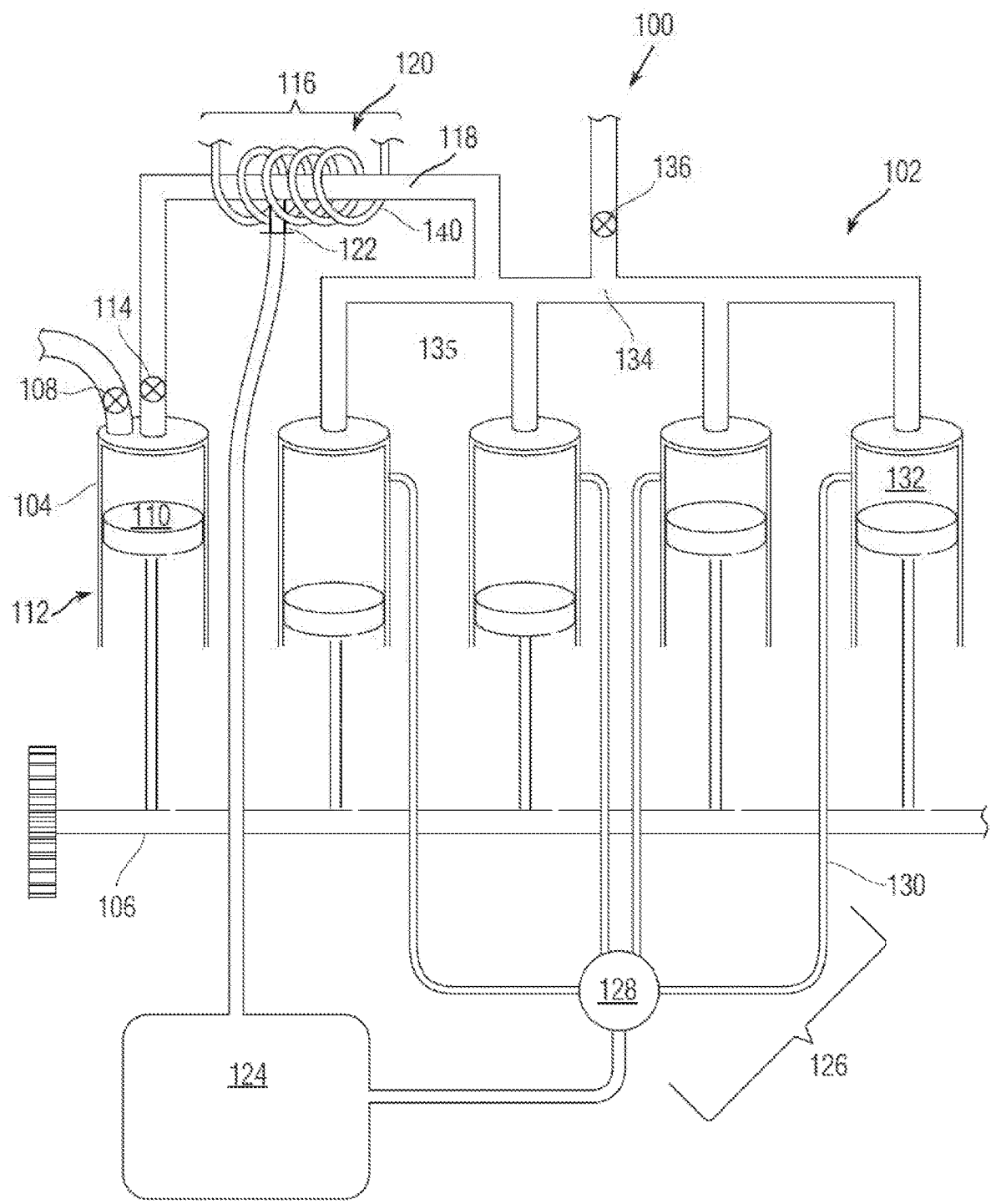
FIG. 1 illustrates a schematic representation of an exemplary ambient air condensation and injection-enabled internal combustion engine system of the present disclosure, wherein the internal combustion engine is shown coupled to a sealable chamber, a cooling section, a reservoir, and a water injector.

FIG. 1 shows a schematic representation of an ambient air condensation and injection-enabled internal combustion engine system 100 of the present disclosure. Selected purely for illustration purposes and not limiting of the disclosure, the type of internal combustion engine 102 shown in FIG. 1 is an inline-four (I4), or straight-four, internal combustion four-cylinder engine that has all four cylinders mounted in a straight line, or plane, along the crankcase. While an inline-four is shown and described herein, the present disclosure applies equally to all types, cycles and configurations of internal combustion engines including, without limitation, compression-ignition engines, spark-ignition engines, I6, I8, F4, F6, F8, V4, V6, V8, and V12 engines, etc. The internal combustion engine 102 depicted in FIG. 1 is a conventional, inline-four Otto-cycle spark-ignition internal combustion engine. Coupled to the internal combustion engine 102 is a sealable chamber 104 that is configured to draw in and compress a volume of ambient air during operation of the engine. Raising the pressure of the captured ambient air through compression has the advantageous effect of raising the saturation temperature, or boiling point, of the air. The result is that the refrigeration unit of the present disclosure saves more energy than cooling arrangements of the prior art because it does not need to reduce the temperature of the compressed ambient air to the extent that would be required using prior art arrangements to obtain comparable amounts of condensed water vapor. In an embodiment in accordance with the disclosure, the sealable chamber 104 comprises a piston-in-cylinder assembly. In a further embodiment in accordance with the disclosure, the piston-in-cylinder assembly is driven by a crankshaft 106 of the internal combustion engine.

As the internal combustion engine 102 operates in its characteristic reciprocating motion, the sealable chamber 104 draws in a volume of ambient air through an open intake valve 108 of the sealable chamber. Once the piston 110 completes its intake motion, the intake valve 108 closes to seal the ambient air in the sealable chamber. The piston 110 then executes its compression motion, compressing the ambient air toward the top of the cylinder 112. After the ambient air has been compressed, an exit valve 114 opens to allow the compressed ambient air to vent from the sealable chamber 104. The compressed ambient air is received in a cooling section 116. The cooling section 116 comprises a cooling channel 118 and a cooling device 120, wherein the cooling channel 118 comprises a port 122 and contains the compressed ambient air. The cooling device 120 is configured to cool the ambient air contained within the cooling channel 118 to condense water vapor present in the ambient air into liquid water. A reservoir 124 is connected to the port 122 and configured to collect liquid water drained through the port 122 from the cooling channel 118. A water injector 126 is connected to the reservoir 124, wherein the water injector 126 comprises at least one pump 128 and at least one water injector channel 130 connected to at least one combustion chamber 132 of the internal combustion engine 102.

According to an embodiment consistent with the disclosure, the compressed ambient air contained in the cooling channel 118 can be introduced into at least one combustion chamber 132 of the internal combustion engine 102 to realize further improvements in engine performance. For instance, as shown in FIG. 1, the compressed ambient air is introduced from channel 118 through an intake manifold 134 of the internal combustion engine 102. In a still further embodiment the intake manifold 134 can include a mixing valve 136 by which the compressed ambient air is mixed with ambient air prior to introduction into the at least one combustion chamber 132.

One possible embodiment of the cooling device 120 comprises a refrigeration unit that includes a fluid refrigerant-conducting refrigerant channel 140 that is disposed proximate to the cooling channel 118 to remove heat energy from the compressed ambient air. Although not shown, it should be understood that the refrigeration unit can include other components such as pumps for circulating the refrigerant, compressors and other such components that are commonly found in fluid circulation and refrigeration devices. Moreover, in some arrangements, the refrigerant fluid that flows through device 120 could be refrigeration fluid supplied by a separate system, for instance, the in-vehicle air conditioner system. Other types of fluids can be circulated through the channel 140 for the purposes of cooling the surrounding components and materials. For example, the refrigerant fluid could be the engine coolant, the engine lubricant, or more broadly any fluid (liquid or gas) in the vehicle, or even ambient air.

Figure 3:
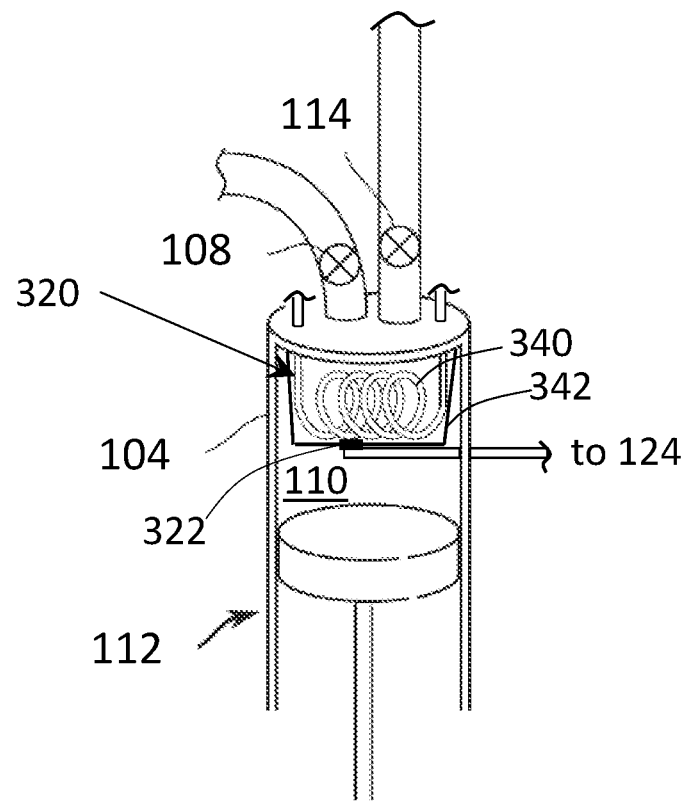
FIG. 3 shows a close-up schematic representation of the ambient air condensation system of FIG. 1 but modified to include elements of the cooling section within the sealable air compression chamber.

In addition or alternatively to providing a cooling device having a refrigerant channel 140 proximate to the cooling channel 118, as shown in FIG. 1, the refrigerant channel can be provided at other locations within ambient air condensation system 100 of the present disclosure. For example, FIG. 3 is a close-up view of the compression chamber 104, wherein the compression chamber has been modified to include the cooling device 320 comprising refrigerant channel 340 located within the compression chamber 104 to realize further improvements in engine performance. Tray 342 is positioned relative to the refrigerant channel 340 so as to catch condensate accumulating on the outside of the refrigerant channel 340. Condensate is directed via the fluid outlet port 322 it to the reservoir 124 (not shown) via the tube extending from the port 322 as shown in FIG. 3. Some benefits of moving the cooling device inside the piston-cylinder compression chamber apparatus would be potentially easier packaging, as well as an opportunity for achieving higher pressure (and thus lower dewpoint of the air). In yet a further embodiment, a cooling device 320 can similarly be provided within a combustion chamber.

Figure 2:
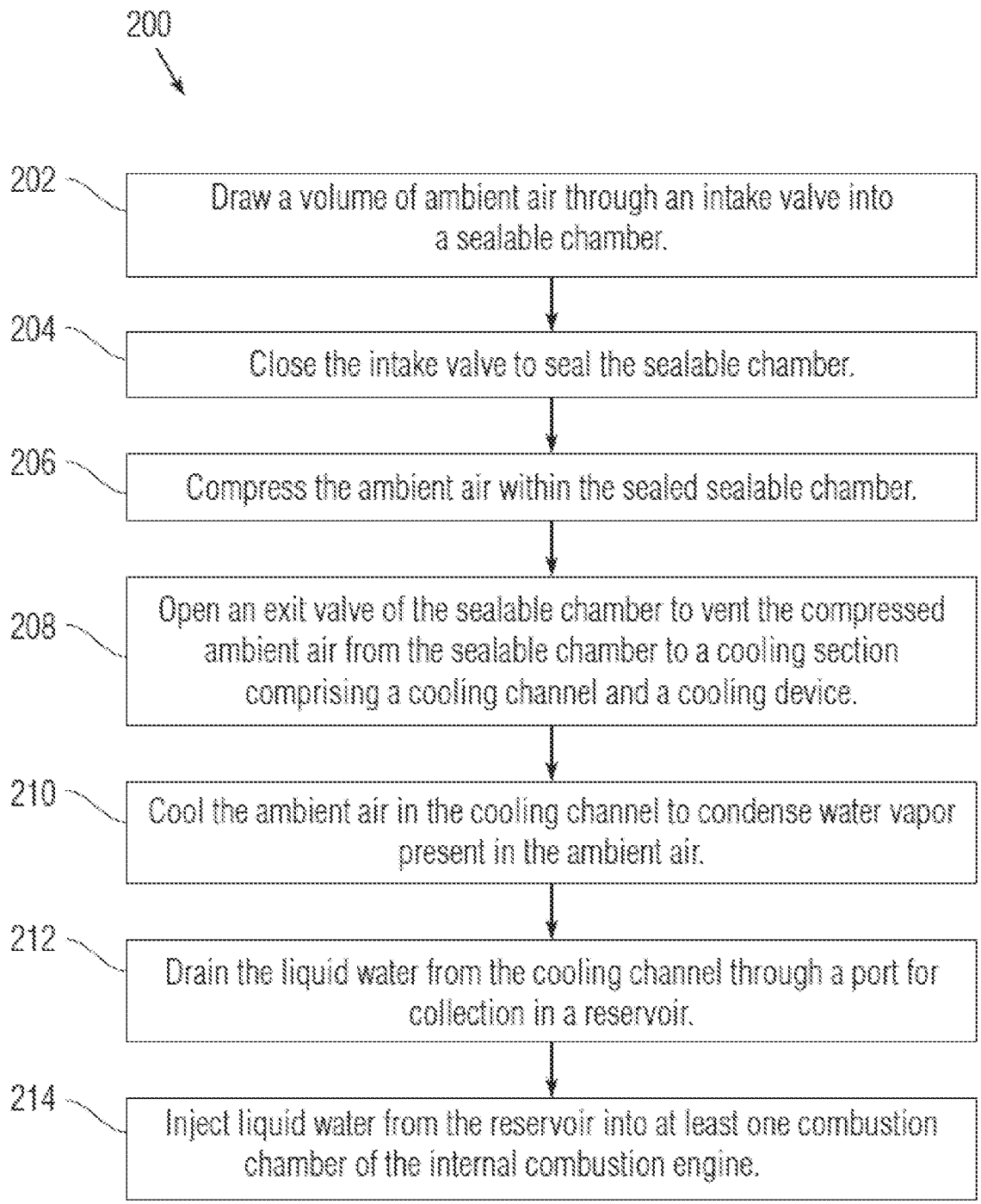
FIG. 2 illustrates a flowchart detailing a method according to the present disclosure.

FIG. 2 is a flowchart detailing a method 200 according to the present disclosure. The method begins at step 202 with drawing a volume of ambient air through an intake valve 108 into a sealable chamber 104. Once the intake of ambient air is completed, step 204 of the disclosed method entails closing the intake valve 108 to seal the sealable chamber. The ambient air is compressed within the sealed sealable chamber in step 206, and then step 208 opens an exit valve 114 of the sealable chamber 104 to vent the compressed ambient air from the sealable chamber to a cooling section 116, wherein the cooling section 116 comprises a cooling channel 118 and a cooling device 120, and wherein the cooling channel 118 comprises a port 122 and contains the compressed ambient air. Step 210 of the disclosed method proceeds by using the cooling device 120 to cool the ambient air contained within the cooling channel 118 to condense water vapor present in the ambient air into liquid water. The liquid water thus condensed is then drained from the cooling channel 118 in step 212 through the port 122 and collected in a reservoir 124 connected to the port. Having condensed and collected a supply of liquid water, step 214 of the disclosed method can proceed by injecting liquid water from the reservoir 124 into at least one combustion chamber 132 of the internal combustion engine 102.

According to an embodiment consistent with the disclosure, the method further comprises introducing the compressed ambient air into at least one combustion chamber 132 of the internal combustion engine 102. According to a further embodiment consistent with the disclosure, the compressed ambient air is introduced through an intake manifold 134 of the internal combustion engine 102, and according to a still further embodiment the compressed ambient air is directed through a mixing valve 136 of the intake manifold 134 to be mixed with ambient air.

The present disclosure has been described with reference to the accompanying drawings, which form a part hereof, and which show, by way of illustration, example implementations and/or embodiments. As such, the figures and examples above are not meant to limit the scope of the present application to a single implementation, as other implementations are possible by way of interchange of some or all of the described or illustrated elements, without departing from the spirit of the present disclosure. Among other things, for example, the disclosed subject matter can be embodied as methods, devices, components, or systems.

Moreover, where certain elements of the present application can be partially or fully implemented using known components, only those portions of such known components that are necessary for an understanding of the present application are described, and detailed descriptions of other portions of such known components are omitted so as not to obscure the application. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present application encompasses present and future known equivalents to the known components referred to herein by way of illustration.

Furthermore, it is recognized that terms used herein can have nuanced meanings that are suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter can be based upon combinations of individual example embodiments, or combinations of parts of individual example embodiments.

The foregoing description of the specific implementations will so fully reveal the general nature of the application that others can, by applying knowledge within the skill of the relevant art(s) (including the contents of the documents cited and incorporated by reference herein), readily modify and/or adapt for various applications such specific implementations, without undue experimentation, without departing from the general concept of the present application. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown of drawings are shown accordingly to one example and other dimensions can be used without departing from the present disclosure.

While various implementations of the present application have been described above, it should be understood that they have been presented by way of example, and not limitation. It would be apparent to one skilled in the relevant art(s) that various changes in form and detail could be made therein without departing from the spirit and scope of the disclosure. Thus, the present disclosure should not be limited by any of the above-described example implementations, and the invention is to be understood as being defined by the recitations in the claims which follow and structural and functional equivalents of the features and steps in those recitations.

What is claimed:

1. A method for condensing water for injection into an internal combustion engine to increase the engine's fuel economy and performance while reducing emissions, the method comprising:
   drawing a volume of ambient air through an intake valve into a sealable chamber;
   closing the intake valve to seal the sealable chamber;
   compressing the ambient air within the sealed sealable chamber;
   opening an exit valve of the sealable chamber to vent the compressed ambient air from the sealable chamber to a cooling section, wherein the cooling section comprises:
      a cooling channel comprising a port and containing the compressed ambient air; and
      a cooling device;
   using the cooling device to cool the ambient air contained within the cooling channel to condense water vapor present in the ambient air into liquid water;
   draining the liquid water from the cooling channel through the port for collection in a reservoir connected to the port; and
   injecting liquid water from the reservoir into at least one combustion chamber of the internal combustion engine.

2. The method as in claim 1, further comprising introducing the compressed ambient air into at least one combustion chamber of the internal combustion engine.

3. The method as in claim 2, wherein the compressed ambient air is introduced through an intake manifold of the internal combustion engine.

4. The method as in claim 3, wherein the compressed ambient air is directed through a mixing valve of the intake manifold to be mixed with ambient air.

5. The method as in claim 1, wherein the cooling device comprises a refrigeration unit, the refrigeration unit comprising a refrigerant-conducting refrigerant channel that is disposed proximally to the cooling channel to remove heat energy from the compressed ambient air.

6. The method as in claim 1, wherein the sealable chamber comprises a piston-in-cylinder assembly.

7. The method as in claim 6, wherein the piston-in-cylinder assembly is driven by a crankshaft of the internal combustion engine.

8. A system for condensing water for injection into an internal combustion engine to increase the engine's fuel economy and performance while reducing emissions, the system comprising:
   a sealable chamber coupled to the internal combustion engine and configured to draw in and compress a volume of ambient air, the sealable chamber comprising:
      an intake valve, which in an open state is configured to allow ambient air to be drawn into the sealable chamber, and which in a closed state is configured to seal the ambient air in the sealable chamber;
      an exit valve, which in a closed state is configured to seal the ambient air in the sealable chamber, and which in an open state is configured to allow the compressed ambient air to vent from the sealable chamber;
   a cooling section configured to receive the compressed ambient air vented through the exit valve from the sealable chamber, wherein the cooling section comprises:
      a cooling channel comprising a port and containing the compressed ambient air; and
      a cooling device configured to cool the ambient air contained within the cooling channel to condense water vapor present in the ambient air into liquid water;
   a reservoir connected to the port and configured to collect liquid water drained through the port from the cooling channel; and
   a water injector configured to inject liquid water from the reservoir into at least one combustion chamber of the internal combustion engine.

9. The system as in claim 8, further configured to introduce the compressed ambient air into at least one combustion chamber of the internal combustion engine.

10. The system as in claim 9, wherein the internal combustion engine further comprises an intake manifold through which the compressed ambient air is introduced.

11. The system as in claim 10, wherein the compressed ambient air is directed through a mixing valve of the intake manifold to be mixed with ambient air.

12. The system as in claim 8, wherein the cooling device comprises a refrigeration unit, the refrigeration unit comprising a refrigerant-conducting refrigerant channel that is disposed proximally to the cooling channel to remove heat energy from the compressed ambient air.

13. The system as in claim 8, wherein the sealable chamber comprises a piston-in-cylinder assembly.

14. The system as in claim 13, wherein the piston-in-cylinder assembly is driven by a crankshaft of the internal combustion engine.

* * * * *